2,656,334

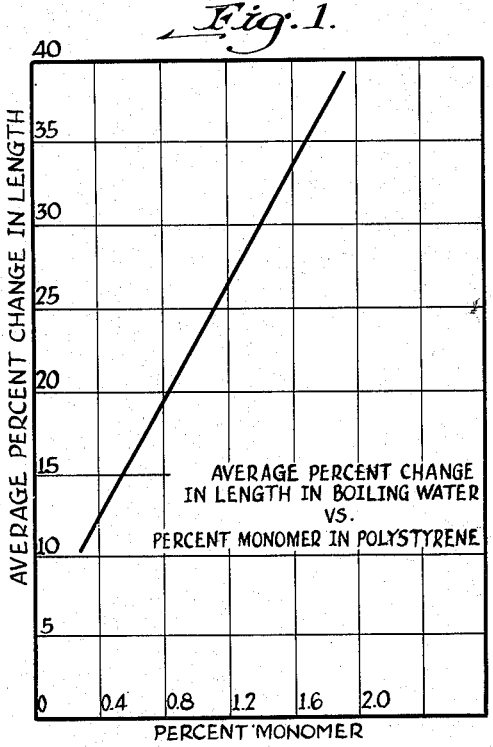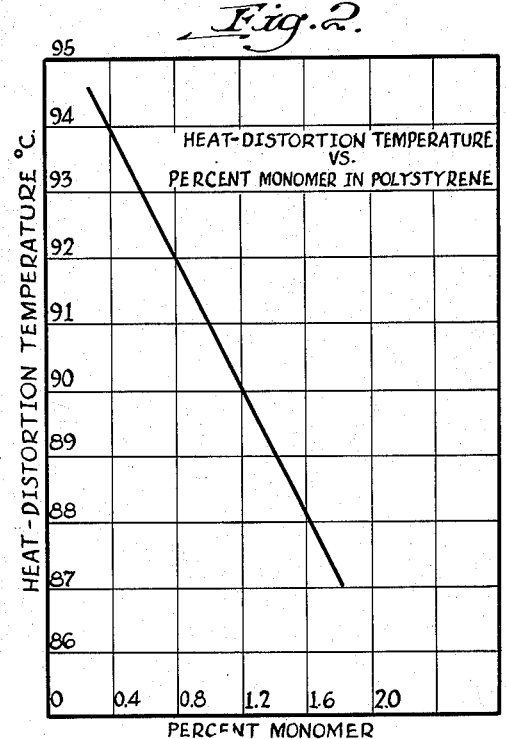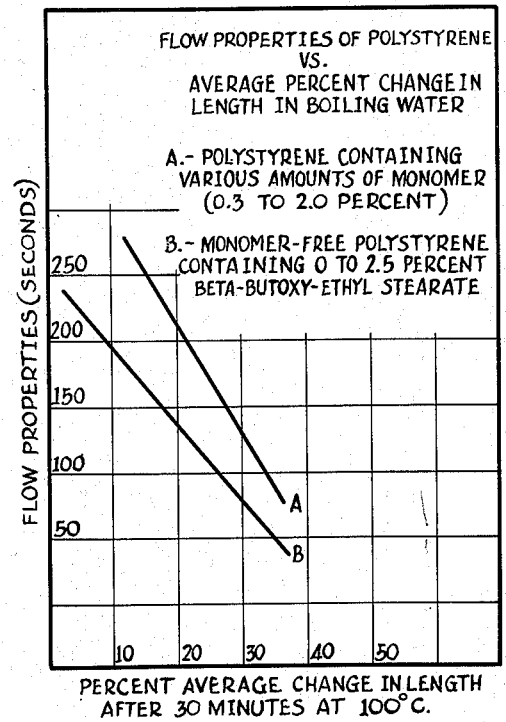
INVENTOR.
GAETANO F. D'ALELIO.
BY Walter J. Monarelli
his ATTORNEY Patented Oct. 20, 1953

UNITED STATES PATENT OFFICE 2,656,334

CATALYTIC POLYMERIZATION PROCESS

Gaetano F. D'Alelio, Pittsburgh, Pa., assignor to Koppers Company, Inc., a corporation of Delaware Application September 28, 1948, Serial No. 51,633

11 Claims. (Cl. 260—47)

This invention relates to a process for the polymerization of vinyl aryl compounds. More specifically, it relates to a process using a new catalyst-combination for the polymerization of vinyl aryl compounds. It also relates to vinyl aryl polymeric products having excellent shrink-resistance, clarity, and high resistance to heat-distortion.

Vinyl aryl polymers having substantial amounts of residual monomer and low-molecular-weight polymers therein usually have certain undesirable properties such as high shrinkage in boiling water, low resistance to heat-distortion, potential discoloration due to oxidation of monomer, and crazing due to escape of volatile or fugitive materials. For example, the standard grades of polystyrene available for commercial purposes generally have from about 0.4 to over 1.0 per cent by weight residual monomer. As may be seen by a study of Figures I and II, such amounts of monomer are associated with unfavorable effects on certain thermal properties of polystyrene. Figure I indicates a relationship of monomer content with the per cent average shrinkage in length of molded polystyrene specimens caused by immersion in boiling water (100° C.) for 30 minutes. Figure II shows an association between the amount of residual monomer in polystyrene and polymer resistance to heat-distortion. Figure III shows the relationship of flow properties for a typical commercial polystyrene with its shrink resistance (curve A) as compared with the improved relationship of these properties in a lubricated polystyrene prepared by the process of this invention (curve B), which figure is described more fully hereinafter.

For the above-indicated reasons there has been considerable interest in producing substantially monomer-free vinyl aryl polymers, the term "substantially monomer-free" being used herein to mean a monomer content of not more than 0.1 percent by weight, advantageously not more than 0.01 percent. The importance of and the desire for such improved polymer products are emphasized by the premium prices which industry has been willing to pay for molding compositions of such materials. At present the only known methods for reducing the residual monomer content in vinyl aryl polymers employ expensive techniques and equipment for the removal of residual monomer from the polymer products. In addition to the expense involved, the products obtained by such treatments have a hazy, discolored appearance and after contact with boiling water have a rough surface, all very likely due to the method of preparation of processing. Moreover, these premium products are not available in bead form, which form has advantages in certain applications.

It has now been found that improved polymers of vinyl aryl compounds may be obtained by employing in the polymerization of vinyl aryl compounds a catalyst-combination consisting of a benzoyl peroxide plus at least one other organic peroxy compound, of the class consisting of tertiary-butyl perbenzoate, di-tertiary-butyl diperphthalate and 2,2-di-(tertiary-butyl-peroxy)-butane, and heating at a temperature between about 25° C. and about 95° C. until at least about 60 percent conversion of monomer to polymer has been effected and then heating at a temperature between about 100° C. and about 150° C. until substantially complete polymerization has been effected. In this manner, polymers are obtained which have excellent resistance to shrinkage, clarity and high resistance to heat-distortion. Moreover, the use of plasticizers together with the catalyst-combinations of this invention permits the preparation of lubricated polymers having improved relationship between flow properties and shrink resistance.

The process of this invention is applicable to all vinyl aryl compounds and is particularly advantageous in the polymerization of styrene. The clear polystyrene obtained by the practice of this invention is a new product which maintains a clarity not attainable by substantially monomer-free polystyrenes produced by prior art methods of removing residual monomer from styrene polymers. This distinction is made obvious by a visual comparison of molded pieces from polystyrene prepared according to the process of this invention with those from representative samples of the premium grade commercial polystyrene prepared by other methods, the former being crystal-clear, having a light transmission of at least about 85 percent of visible light through a 1-centimeter thickness as determined photoelectrically and compared to transmission of light through air, and the latter having a definite yellow color. In addition, the application of the present invention to suspension polymerization systems effects the preparation of beads of substantially monomer-free polystyrene, which beads have not been previously available since the prior art methods of preparing substantially monomer-free polystyrene produce the polymer in powder or other form. The substantially monomer-free, clear polystyrenes of this invention when formed into shaped articles have, upon immersion for 30 minutes in boiling water (100° C.), a change in length of less than about 7 percent, usually less than about 5 percent, and also usually have a heat-distortion temperature of at least about 93° C.

The term "a benzoyl peroxide" is intended to include benzoyl peroxide and those derivatives of benzoyl peroxide having one or more chloro, bromo, fluoro, alkoxy (i. e., methoxy, ethoxy, propoxy and butoxy), alkyl (i. e., methyl, ethyl, propyl and butyl), benzo, or carboperoxy groups attached to the aromatic nucleus. Such substituents may be attached to either or both of the aromatic nuclei of the benzoyl peroxide. This class includes such peroxides as chlorobenzoyl, bromobenzoyl, fluorobenzoyl, alkoxy-benzoyl, alkyl-benzoyl, phthaloyl and naphthoyl peroxides.

The use of mixtures of organic peroxy compounds as polymerization catalysts is not new in itself. "Trigger-systems" have been known wherein a small amount of a strongly active peroxide, such as cyclohexyl hydroperoxide, sets off a slow peroxide, such as tertiary-butyl hydroperoxide. Such systems permit the use of an otherwise slow catalyst to give the desired degree of polymerization or cure in a short time without the increase in peak temperature or exotherm otherwise necessary. More recent disclosures have shown, for use with alloxyethyl methacrylates, etc., a mixture of a relatively heat-sensitive organic peroxide, such as benzoyl peroxide, with certain relatively heat-stable peroxides, such as tertiary-butyl-hydroperoxide, di-tertiary-butyl peroxide, 1-hydroxy-cyclohexyl-hydroperoxide-1, etc., first at a temperature below 75° C. and then above 120° C. However, the above-mentioned catalyst-combinations have not been found satisfactory for the process of the present invention to produce substantially monomer-free vinyl aryl polymers.

The decomposition characteristics or free-radical formation of a particular peroxy compound are usually somewhat dependent on its surroundings, i. e., on the monomer or other peroxy compound admixed with it. For example, the decomposition temperature of a peroxy compound by itself may be quite different from that exhibited under the influence of a monomer or other peroxy compound. Moreover, these characteristics may be varied by the type of monomer or peroxy compound. Furthermore, the selection of peroxy compounds to use in combination with a particular peroxide, such as benzoyl peroxide, may often be dependent on the type of polymerization system to be used. It has now been found, however, that the particular catalyst combinations of this invention operate very satisfactorily and may be used to produce the improved vinyl aryl polymers of this invention.

The effective proportions of catalysts in the catalyst-combinations and effective proportions of catalyst-combination to monomer are dependent somewhat on the amount of residual monomer permissible in the polymer products, the specific catalyst-combination, the particular monomer or monomers, the type of polymerization system, the temperatures, the time of heating, and the effect of plasticizers, emulsifying agents, diluents, etc., present in the polymerization mixtures. Although the influence of many of these factors often must be determined in each particular instance, certain generalizations may be made. For example, it may be stated as generally true that low temperatures in the first heating stage over relatively long periods may permit more efficient use of the primary catalyst, i. e., the benzoyl peroxide, so that less secondary catalyst, such as t-butyl perbenzoate, etc., can be required. Moreover, the required amount of secondary catalyst can also be reduced by the use of the lowest temperatures possible in the effective range for the second heating stage over relatively long periods, thereby obtaining possibly more efficient use of the secondary catalyst than possible at higher temperatures. In addition, complete polymerization usually may be favored by a relatively high temperature at the end of the heating schedule. Thus, it is obvious that determinations of the limitations for effective ranges of catalyst ratios and catalyst-combination concentrations are difficult without specific reference to the temperatures and other conditions to be used. Moreover, the use of the low temperatures referred to above will necessitate longer heating periods, which is an important cost factor and must also be considered in determining the conditions to be applied to any particular polymerization.

In order to make easier comparisons of the catalytic efficiencies of various peroxides, peresters and perethers with each other and with various combinations of each other, equivalent weights of these compounds may be determined in the following manner. First, a determination is made of the equivalent weight of benzoyl peroxide or that weight required per unit weight of styrene to give, by a particular heating schedule, a polystyrene having a relative viscosity of about 2.5, e. g., from 2.40 to 2.55. Then the equivalent weight of a secondary catalyst, i. e., tertiary-butyl perbenzoate, etc., is determined which will give a polystyrene of the same relative viscosity by use of the same heating schedule. Thereafter, the amounts of catalyst or mixtures of catalyst to be used for such a heating schedule can be selected according to these equivalents. For example, an 80–20 mixture of benzoyl peroxide and tertiary-butyl perbenzoate contains these catalysts in respective amounts having a ratio corresponding to the ratio of 80 percent of the equivalent weight of benzoyl peroxide to 20 percent of the equivalent weight of tertiary-butyl perbenzoate. The term "mixture" as used herein in connection with the catalysts in the catalyst-combinations refers to ultimate mixture in the polymerization medium in view of the fact that, although the individual catalysts are advantageously added to the polymerization system prior to or shortly after initiation of the polymerization, the secondary catalysts can be added, when convenient, any time prior to or shortly after the beginning of the second heating stage, possibly even after decomposition of most of the primary catalyst.

As previously mentioned, a determination of the limits on operative amounts of catalysts for the process of this invention is rather difficult because of the numerous factors involved. In addition, the lower limit on the effective range for amounts of catalyst-combination necessary for the operation of this invention will vary according to the ratio of the catalysts in the combination, so that a determination of such lower limit has little meaning or value. Generally, however, there should be present at least 0.05, advantageously at least 0.1 percent of the catalyst-combination. Moreover, in such catalyst-combinations, the ratio of equivalent weights of primary catalyst to secondary catalyst should be at least about 99-1; advantageously 98-2, for practical operation. Nevertheless, as pointed out before, such lower limits on the secondary catalyst are dependent to some extent on the heating schedule employed and, in some cases, smaller amounts of secondary catalyst are sometimes permissible with longer heating in one or both of the heating stages, or with a high final temperature. From a practical viewpoint, the upper limit on the proportion of secondary catalyst is determined chiefly by the cost factor. In suspension polymerizations, however, this upper limit is also determined somewhat by the fact that the presence of the secondary catalyst in large proportions may result in poor control of the suspension polymerization and may thereby cause precipitation or lump formation through coagulation of polymer beads. This is generally avoided, however, by catalyst ratios greater than 30-70, i. e., equivalents of benzoyl peroxide type catalyst to equivalents of secondary catalyst.

The process of this invention is especially applicable to suspension polymerization systems. In such systems considerable precaution must be taken to prevent coalescence of the globules of monomer, polymer or mixtures thereof. Such coalescence may result in the precipitation of monomer or polymer from the system. For this reason, it has generally been found necessary to operate suspension polymerization systems below certain temperatures until at least a definite degree of polymerization or conversion from monomer to polymer has been effected. For example, in the case of styrene, the temperature is generally desirably maintained below 95° C. until at least about 60 per cent conversion to polymer has been effected. Once the conversion has reached this stage, the temperature may be increased with considerably reduced likelihood of coalescence or precipitation. It can be understood, therefore, that the active ranges of the catalyst-combinations of this process are well suited to the requirements of suspension polymerization systems for vinyl aryl compounds, since the first heating stage carries the polymerization past the "sticky" phase or that phase of the polymerization at which the system is very susceptible to coalescence; and the higher temperature of the second heating stage aids in the completion of the polymerization after the possibility of coalescence has thus been reduced.

Although the application of the present process has been especially advantageous in suspension polymerization, it also effects improvements in producing vinyl aryl polymers by means of mass, solution, and emulsion polymerizations as hereinafter illustrated in the Examples V, VI and VII. The difficulty in promoting complete polymerization is encountered in these polymerization systems, as well as in suspension polymerization systems, and the process of this invention is used advantageously in effecting improvements in the per cent conversion to polymer in such systems.

The invention may best described by the following examples which are not intended as limitations on the invention but merely to illustrate various methods of practicing the invention. In these examples and throughout the specification, references to "parts" and "percentages" mean parts by weight and percentages by weight. Unless specified otherwise, the determination of monomer-content was performed by the ultraviolet spectra-photometric procedure described in Analytical Chemistry 20, 312 (1948). The standard shrinkage or boiling test consists of immersion of polymer samples for 30 minutes in boiling water, a 100° C. temperature being maintained by the addition of sufficient salt and by continuous reflux. Except in the two cases pointed out in Examples V and IX, the shrinkage tests were made on test bars prepared by injection molding. The bars as molded were 8½" x ⅛" x ¾" but were cut to 4¼" x ⅛" x ¾" before the boiling test.

In whichever of the following examples suspension polymerizations are indicated, the suspensions were stabilized by the use of hydroxy apatite (calcium hydroxy hexaphosphate) as suspension agent and the procedures followed are similar to those disclosed by J. M. Grim in copending patent applications Serial Numbers 786,655 and 786,656, filed November 18, 1947 and assigned to the same assignee as the present application. However, the present process is not limited to such processes of suspension polymerization but may be used with any suspension polymerization process. The polymerizations are advantageously conducted in an inert atmosphere, such as nitrogen, methane, etc.

*Example I*

Four polymerization experiments were performed under similar conditions except for the catalyst used. The four polymerizations were catalyzed by the following amounts of catalysts, the total amounts of catalysts in the various experiments being equivalent in peroxide efficiency:

A. 0.2 per cent benzoyl peroxide (based on weight of monomer);
B. 0.18 percent benzoyl peroxide plus 0.05 percent t-butyl perbenzoate;
C. 0.16 percent benzoyl peroxide plus 0.10 percent t-butyl perbenzoate;
D. 0.14 percent benzoyl peroxide plus 0.15 percent t-butyl perbenzoate.

In each of the experiments styrene was polymerized in a suspension system containing:

90 parts styrene (containing dissolved catalyst)
200 parts distilled water
1 percent hydroxy apatite (submicronic particle size)
0.01 percent sodium oleate These materials were placed in glass bottles, capped and then agitated by a rocking mechanism while the bottles were immersed in a controlled-temperature bath at 90° C. for 7 hrs. and then at 113–115° C. for 3 hours. In each case, the polymer beads which were obtained were washed with dilute HCl, then with water, dried at 70° C. for two hours, and subsequently examined and tested for percent residual monomer, heat-distortion and percent shrinkage. The results are as follows:

| Run No. | | Ratio of Equivalents BP-tBP | Percent Residual Monomer | Heat-Distortion Temp., °C. | Percent change in Boiling Water | |
|---|---|---|---|---|---|---|
| | | | | | Length | Width |
| A | TP-174 | 100-0 | 1.20 | 90.0 | 22.4 | 5.0 |
| B | S-467 | 90-10 | 0.01 | 94.2 | 5.93 | 1.47 |
| C | TP-175 | 80-20 | 0.00 | 94.1 | 5.9 | 1.1 |
| D | S-468 | 70-30 | 0.00 | 94.5 | 5.39 | 0.90 |

*Example II*

The procedure of Example I was repeated in four experiments using the same materials and amounts as in Example I except for the catalyst-combinations which were as follow, the total amounts of catalysts in the various experiments being equivalent in peroxide efficiency:

A. 0.2 percent benzoyl peroxide (based on weight of monomer);
B. 0.12 percent benzoyl peroxide plus 0.20 percent di-t-butyl diperphthalate;
C. 0.10 per cent benzoyl peroxide plus 0.25 percent di-t-butyl diperphthalate;
D. 0.06 percent benzoyl peroxide plus 0.35 percent di-t-butyl diperphthalate.

The results of the tests on the polymer products were as follow:

| | Run No. | Ratio of Equivalents BP-DtBP | Percent Residual Monomer |
|---|---|---|---|
| A | S-497 | 100-0 | 1.40 |
| B | S-493 | 60-40 | 0.01 |
| C | S-492 | 50-50 | 0.01 |
| D | S-490 | 30-70 | 0.01 |

*Example III*

The procedure of Example I was repeated in five experiments using the same materials and amounts as in Example I except for the catalyst-combinations which were as follows, the total amounts of catalysts in the various experiments being equivalent in peroxide efficiency:

A. 0.2 percent benzoyl peroxide (based on weight of monomer);
B. 0.16 percent benzoyl peroxide (BP) plus 0.04 percent 2,2-di-(tertiary-butyl-peroxy)-butane (2,2-DPB);
C. 0.14 percent benzoyl peroxide plus 0.06 percent 2,2-di-(tertiary-butyl-peroxy)-butane;
D. 0.10 percent benzoyl peroxide plus 0.10 percent 2,2-di-(tertiary-butyl-peroxy)-butane;
E. 0.08 percent benzoyl peroxide plus 0.12 percent 2,2-di-(tertiary-butyl-peroxy)-butane;

The results of the tests on the polymer products are as follows:

| | Run No. | Ratio of Equivalents BP-2, 2DPB | Percent Residual Monomer | Heat Dist. Temp., °C. | Percent Change in Boiling Water Length |
|---|---|---|---|---|---|
| A | S-673 | 100-0 | 0.75 | 92.2 | 18.2 |
| B | PK-13 | 80-20 | 0.00 | 93.9 | 4.8 |
| C | S-670 | 70-30 | 0.00 | | 5.96 |
| D | S-668 | 50-50 | 0.00 | | |
| E | S-667 | 40-60 | 0.00 | | |

*Example IV*

A number of styrene suspension polymerizations were conducted in glass-lined, enclosed steel reactors, jacketted for compound heating and cooling, and equipped with a glass-coated impeller-agitator and upward-baffle for very efficient agitation. In each polymerization a combination-catalyst, i. e. benzoyl peroxide (BP) plus tertiary-butyl perbenzoate (t-BP), was used in an amount equivalent to 0.2 percent benzoyl peroxide, based on the weight of styrene. The charge in each case is as follows with the amount of catalyst indicated in the table of results given below, and with a heating schedule of 6½ hours at 92° C. and 4 hours at 114–116° C.

5500 parts styrene
4500 parts deionized-deoxygenated water
55 parts hydroxy apatite (submicronic particle size)
0.125 parts sodium sulfonate of dodecyl benzene

| Run No. | Ratio of Equivalents BP-tBP | Percent Residual Monomer | Heat Dist. Temp., °C. | Boiling Tests—Percent Average Change in — | | |
|---|---|---|---|---|---|---|
| | | | | Length | Width | Thickness |
| PK-4 | 90-10 | 0.00 | 96.1 | 1.4 | 1.9 | 1.8 |
| PK-6 | 92-8 | 0.00 | 95.7 | 1.9 | 1.2 | 2.2 |
| PK-8 | 94-6 | 0.00 | 95.7 | 2.8 | 0.9 | 1.7 |
| PK-2 | 96-4 | 0.09 | 95.2 | | | |
| 567 | 97-3 | 0.00 | 95.6 | 7.2 | 1.2 | 3.1 |
| 580 | 99-1 | 0.18 | 95.0 | 13.9 | 3.1 | 5.9 |

The three experiments using catalyst ratios of 96-4, 97-3 and 99-1 could advantageously have used longer heating schedules to reduce the residual monomer content or shrinkage.

*Example V*

Freshly distilled styrene was polymerized in bulk using benzoyl perozide (BP) alone, and benzoyl peroxide plus tertiary-butyl perbenzoate (t-BP). As indicated below in the tabulated data, the combination-catalyst was particularly effective in reducing the monomer content and shrinkage. In this case, the test bars (4⅝″ x 1/10″ x ½″)

were prepared by compression-molding rather than by the injection-molding procedure used in the other examples. Injection-molding procedures emphasize the requirement for shrink-resistant polymers since greater stresses and strains are produced in the molded articles, which increased stresses and strains result in greater shrinkages or dimensional changes on heating. On the other hand compression-molding does not produce such a high degree of stresses and strains in the molded articles and the subsequent dimensional changes produced by heat are not as pronounced as in injection-molded articles. Therefore, as indicated below, the improvement in shrink resistance is remarkable for the articles compression-molded from polystyrene prepared by bulk polymerization according to the process of this invention.

| | Run No. | Percent BP | Percent tBP | Ratio of Equivalents BP-tBP | Percent Residual Monomer | Percent change [1] in length in Boiling Water |
|---|---|---|---|---|---|---|
| (A) | 755A | 0.2 | | | 6.07 | 1.45 |
| (B) | 756A | 0.16 | 0.10 | 80-20 | 0.02 | 0.88 |

[1] Of compression-molded test bars instead of injection-molded bars.

Of compression-molded test bars instead of injection-molded bars.

Example VI

The use of a benzoyl peroxide-tertiary-butyl perbenzoate combination-catalyst in solution polymerization of styrene resulted in a 45 percent improvement in percent conversion to polymer as compared with polymerization conducted under identical conditions except that an equivalent amount of benzoyl peroxide alone was used in place of the combination-catalyst. In each case a 10 percent solution of styrene in toluene was placed in a glass bottle, capped, and agitated by a rocking-mechanism while immersed in a temperature-controlled oil bath at 90° C. for 7 hours and at 115° C. for 3 hours. The results are tabulated below:

| Run No. | Percent catalyst | | Ratio of Equivalents BP-tBP | Percent Conversion |
|---|---|---|---|---|
| | BP | tBP | | |
| (A) | 758 | 0.20 | ------ | 100-0 | 25.6 |
| (B) | 759 | 0.16 | 0.10 | 80-20 | 37.1 |

More complete conversion can be effected by the use of more favorable temperatures and heating schedules with the combination-catalysts.

Example VII

This example shows a 10 percent improvement in the reduction of residual monomer content for polymers produced by the emulsion polymerization of styrene using equivalent amounts of benzoyl peroxide (BP), and benzoyl peroxide plus tertiary-butyl perbenzoate (tBP). The procedure followed was similar to that used in Example I except that a heating schedule of 3 hours at 70° C. and 3 hours at 100° C. was employed and the polymerization mixture had the following composition.

40 parts styrene
60 parts distilled water
3 parts sodium sulfonate of dodecyl benzene The data are as follow:

| Run No. | Percent Catalyst | | Ratio of Equivalents BP-tBP | Percent Residual Monomer |
|---|---|---|---|---|
| | BP | tBP | | |
| A | 772 | 0.2 | ------ | 100-0 | 1.30 |
| B | 771 | 0.16 | 0.10 | 80-20 | 1.18 |

The residual monomer content can be still further decreased by the use of more favorable temperatures and heating schedules to be used with the combination-catalysts.

Example VIII

Four copolymers of styrene and ortho-chloro-styrene were prepared by the suspension polymerization procedure of Example I, using 0.16 percent benzoyl peroxide plus 0.10 percent tertiary-butyl perbenzoate for each polymerization. In place of the styrene used in Example I, 90 parts of various mixtures of styrene and ortho-chloro-styrene were used. The proportions of styrene and ortho-chloro-styrene in these mixtures are indicated below in the tabulated data.

Since the presence of a comonomer complicates the spectophotometric analysis for residual monomer, a comparison was made of the percent methanol-soluble material present in the polymer products. The numerical value for percent methanol-solubles is usually higher than the spectographic value for percent residual monomer. The data indicate the low methanol-solubles content, and the excellent shrink-resistance and heat distortion-temperatures of the copolymer products.

| Run No. | Monomer Composition | | Methanol Solubles | Boiling Tests, Percent Change | | Heat Dist. Temp. |
|---|---|---|---|---|---|---|
| | Percent Styrene | Percent o-Cl-Styrene | | Length | Width | |
| S-625 | 90 | 10 | 1.2 | 2.99 | 0.74 | 95.7 |
| S-626 | 75 | 25 | 0.7 | 4.66 | 1.14 | 94.6 |
| S-629 | 36 | 64 | 1.8 | 0.16 | 0.09 | 98.2 |
| S-630 | 25 | 75 | 2.7 | 0.18 | 0.00 | 96.5 |

Example IX

Two copolymers of styrene and diethyl fumarate were prepared by the suspension polymerization procedure of Example I. In place of styrene, 90 parts of a mixture was used which mixture consisted of 95 percent styrene and 5 percent diethyl fumarate. The amounts of catalyst used are equivalent and as indicated in the table below.

The reduction in percent methanol-solubles effected by the process of this invention is indicated by comparison of the value for polymer (B) with that for (A). The shrink-resistance is correspondingly improved. As in Example V, the shrinkage tests were conducted on compression molded bars and the same qualifications apply with regard to evaluating the shrinkage data as described in Example V. The data for the copolymers are summarized in the following table.

| Run No. | Percent BP | Percent tBP | Ratio of Equivalents BP-tBP | Percent Methanol Solubles | Percent Shrinkage in Length [1] |
|---|---|---|---|---|---|
| (A) | 762 | 0.2 | ------ | ------ | 5.70 | 3.72 |
| (B) | 761 | 0.16 | 0.10 | 80-20 | 0.70 | 1.77 |

[1] Of compression-molded test bars.

Example X

A copolymer of styrene and acrylonitrile was prepared by suspension polymerization according to the procedure of Example I, using 0.16 percent benzoyl peroxide plus 0.10 percent tertiary-butyl perbenzoate. In place of the styrene used in Example I, 90 parts of a mixture was used, which mixture contained 90 percent styrene and 10 percent acrylonitrile. The resultant copolymer had a boiling water shrinkage of 6.07 percent in length.

As may be seen from the above examples, conditions especially suitable for the suspension polymerization of styrene are temperatures of 90 to 95° C., advantageously 90° C., for an initial heating of at least approximately six hours, with temperatures of 100 to 116° C., advantageously 112 to 116° C. for a subsequent heating of at least three and one-half hours. As stated previously there should be at least about 0.05 percent, advantageously at least about 0.1 percent of the catalyst-combination, meaning its benzoyl peroxide equivalent, based on the weight of styrene, The following table indicates the actual weight percentages of the catalyst-combinations used for various catalyst ratios in various concentrations given as benzoyl peroxide (BP) equivalents.

| Ratio of Equivalents | 0.05% BP plus— | | | 0.10% BP plus— | | | 0.20% BP plus— | | |
|---|---|---|---|---|---|---|---|---|---|
| | BP | tBP or DtBP | or 2,2DPB | BP | tBP or DtBP | or 2,2DPB | BP | tBP or DtBP | or 2,2DPB |
| 99-1 | 0.0495 | 0.0013 | 0.0005 | 0.099 | 0.0025 | 0.001 | 0.198 | 0.005 | 0.002 |
| 98-2 | 0.049 | 0.0025 | 0.001 | 0.098 | 0.005 | 0.002 | 0.196 | 0.010 | 0.004 |
| 90-10 | 0.045 | 0.0125 | 0.005 | 0.090 | 0.025 | 0.010 | 0.180 | 0.050 | 0.020 |
| 80-20 | 0.040 | 0.025 | 0.010 | 0.080 | 0.05 | 0.020 | 0.160 | 0.100 | 0.040 |
| 70-30 | 0.035 | 0.0375 | 0.015 | 0.070 | 0.075 | 0.030 | 0.14 | 0.150 | 0.060 |
| 30-70 | 0.006 | 0.110 | 0.044 | 0.030 | 0.175 | 0.070 | 0.06 | 0.35 | 0.140 |

Thus, for an equivalent of 0.05 percent benzoyl peroxide, there should be present at least 0.006 percent benzoyl peroxide and at least 0.0013 actual weight percent of tertiary-butyl perbenzoate based on the weight of monomer, the total weight of the catalyst-combination being equivalent to 0.05 percent benzoyl peroxide. For an equivalent of 0.10 percent benzoyl peroxide, there should be present at least 0.03 percent benzoyl peroxide and at least 0.0025 percent tertiary-butyl perbenzoate, the total weight of the catalyst-combination being equivalent to 0.10 percent benzoyl peroxide based on the weight of monomer.

Generally the lower limit for the temperature range of the first heating stage is that temperature at which the benzoyl peroxide type catalyst will promote an appreciable rate of polymerization under the influence of monomer and other peroxy compounds, and under other conditions of polymerization. While benzoyl peroxide will usually catalyze vinyl aryl polymerizations at room temperature, or about 25° C., the rate of polymerization generally is not sufficient to be very practical until a temperature of about 50° C., or more advantageously 60° C., is reached. Many of the substituted benzoyl peroxides have lower decomposition temperatures than benzoyl peroxide itself and can usually be employed to good advantage in promoting polymerizations at temperatures of 25° C. or higher. It has been found that the catalyst-combinations of this invention operate satisfactorily in a temperature range of about 25°–95° C. for the first heating stage, advantageously about 50°–95° C. when benzoyl peroxide itself is used. For the second heating stage a temperature range of about 100–150° has generally been found suitable. As pointed out before, however, there are numerous factors which may effect the polymerizations; and since it is, therefore, difficult to set the temperature limits without some indication of the other conditions involved, it must be understood that the temperature limits may vary somewhat according to these conditions.

The vinyl aryl compounds which may be used in the practice of this invention include styrene, vinyl naphthalenes, etc., and their substitution products. Hereinafter, reference to substituted vinyl aryl compounds is intended to mean vinyl aryl compounds which have substituents replacing hydrogen of the aryl nucleus rather than hydrogen of the vinyl side chain. The substituted vinyl aryl compounds may include those having one or more of the following substituent groups: halogen, such as chloro, fluoro, etc., for example, monochloro-styrene, i. e., ortho-, meta- and para-chloro-styrenes, dichloro-styrenes, trichlorostyrenes, fluorostyrenes, vinyl chloro-naphthalene, p-chloro-p'-vinyl-diphenyl, etc.; hydrocarbon groups, such as alkyl, alkenyl, aryl, aryl-alkyl, alkyl-aryl, cycloaliphatic, etc., for example, methyl-styrenes, such as mono- and dimethyl-styrenes, e. g., para-monomethyl-styrene, 3,4-dimethyl-styrenes, etc., ethyl-styrenes, isopropyl-styrenes, vinyl methyl-naphthalenes, divinyl benzenes, partial polymers of divinyl benzene, phenyl-styrenes, phenethyl-styrenes, tolyl-styrenes, cyclohexyl-styrenes, etc.; cyano, for example, mono- and dicyano-styrenes; substituted alkyl groups, such as trifluoromethyl, cyanomethyl, alkoxyalkyl, carboxyalkyl, etc., for example, trifluoromethyl-styrenes, cyanomethyl-styrenes, methoxymethyl-styrenes, acetoxyethyl-styrenes, etc.

These vinyl aryls may be polymerized, according to the process of this invention, alone, in mixtures containing one or more vinyl aryls, or with one or more other copolymerizable ethylenic compounds. Where styrene or another vinyl aryl compound is copolymerized with a copolymerizable ethylenic compound other than a vinyl aryl compound, it is sometimes advantageous that the vinyl aryl compound be in preponderance, especially when the copolymerizable ethylenic compound is one usually slightly reluctant to copolymerize with styrene or vinyl aryl compound. The preparation of vinyl aryl copolymers by the process of this invention is illustrated by the above Examples VIII, IX, and X.

Illustrative examples of the copolymerizable ethylenic compounds which may be copolymerized with vinyl aryl compounds in accordance with the practice of this invention are: the vinyl halides, e. g., vinyl chloride, vinyl fluoride; the vinylidene halides, e. g., vinylidene chloride, vinylidene fluoride, etc.; the acrylic acids, e. g., acrylic acid, methacrylic acid, chloro-acrylic acid, beta-cyano-acrylic acid; the esters of the acrylic acids, e. g. methyl acrylate, ethyl acrylate, ethyl methacrylate, methyl methacrylate, methyl chloroacrylate, fluorophenyl acrylate, methyl beta-cyano-acrylate; the amides of the acrylic acids, e. g., acrylamide, methacrylamide, chloroacrylamide, beta-cyano-acrylamide; the nitrile derivatives of acrylic, methacrylic, chloroacrylic, beta-cyano-acrylic acids, e. g., acrylonitrile, methacrylonitrile, chloroacrylonitrile, fumaronitrile, etc.; methylene-malonic esters, the mono alkyl esters and the dialkyl esters, e. g., the monomethyl and the dimethyl esters, the dipropyl esters, etc.; allyl derivatives, e. g. acrolein, methacrolein, allyl methyl ketone, allyl ethyl ketone, allyl chloride, allyl methyl ether, allyl ethyl ether, methallyl ethyl ether, allyl phenyl ether, allyl acetate, allyl propionate, allyl acrylate, methallyl acrylate, diallyl phthalate, diallyl oxalate, diallyl succinate, diallyl ether, diallyl ketone, dimethallyl ketone, etc.; maleic, fumaric, citraconic esters, e. g., dimethyl maleate, dimethyl fumarate, diethyl maleate, diethyl fumarate, diisopropyl maleate, dimethyl citraconate, dethyl citraconate, etc.; vinyl ethers, e. g. divinyl ether, vinyl methyl ether, vinyl phenyl ether, etc.; vinyl ketones, e. g., divinyl ketone, vinyl methyl ketone, acrylophenone, etc. The vinyl aryl or mixtures of vinyl aryls may be copolymerized with any copolymerizable ethylenic monomer such as the above or with a mixture containing any number of such monomers.

The process of this invention has been found especially useful in the preparation of plasticized or lubricated polymers. Normally the presence of a plasticizer in a polymer causes an increase in the shrinkage and a lowering of the heat-distortion temperature. However, the improvements in these thermal properties effected by the present invention make it possible to produce plasticized or lubricated vinyl aryl polymers having a resistance to shrinkage and to heat-distortion comparable to that heretofore found only in non-plasticized vinyl aryl polymers.

The distinction between plasticizers and lubricants for polymers is not always very clear. Generally plasticizers have more of a solvent or softening effect on polymers and cause greater changes in the physical properties, e. g., ductility, flexibility and impact strength, than lubricants do. On the other hand, lubricants are used to improve the ease of molding and to aid mold release. Since there is considerable overlapping of the particular function of a great many compounds used to promote ease of flow, and in order to facilitate reference to these compounds, the term "plasticizer" is used broadly hereinafter to include both plasticizers and lubricants.

The improvements effected by the use of plasticizers in accordance with the practice of the present invention are illustrated in the following examples. In these examples and throughout the specification, "flow" means the number of seconds a polymer sample requires to flow 1.5 inches at 135° C. and 1000 p. s. i. through a vertical orifice having a diameter of ⅛" and a length of 1½". The apparatus used in determining the flow is described by the American Society for Testing Materials in specification D569-44T.

*Example XV*

A series of suspension polymerizations of styrene were conducted according to the procedure of Example I using the catalyst-combination of run C and various percentages of beta-butoxyethyl stearate based on the monomer weight. The results from these polymerizations are summarized in the following table.

| Run No. | Butoxyethyl Stearate (Percent) | Flow (Seconds) | Heat Distortion Temp., °C. | Boiling Tests, Percent Change | |
|---|---|---|---|---|---|
| | | | | Length | Width |
| S-676 | 0.0 | 233 | 93 | 4.5 | 0.85 |
| S-677 | 0.5 | 170 | 91.2 | 13.24 | 2.51 |
| S-678 | 1.0 | 126 | 89.5 | 24.82 | 6.18 |
| S-679 | 1.5 | 97 | 87.8 | 23.86 | 4.75 |
| S-680 | 2.0 | 77 | 85.9 | 28.52 | 8.67 |
| S-681 | 2.5 | 68 | 85.5 | 32.73 | 10.69 |

*Example XVI*

Example XV was repeated using butyl stearate in place of beta-butoxy-ethyl stearate. The results are given in the following table.

| Run No. | Butyl Stearate (Percent) | Average Flow (Seconds) | Heat Dist. Temp., °C. | Boiling Tests, Percent Change, Length |
|---|---|---|---|---|
| I-1 | 0.0 | 228 | 94.1 | 5.87 |
| I-2 | 0.5 | 167 | 91.4 | 10.20 |
| I-3 | 1.0 | 121 | 89.2 | 20.12 |
| I-4 | 1.5 | 91 | 88.8 | 17.25 |
| I-5 | 2.0 | 73 | 85.6 | 24.26 |
| I-6 | 2.5 | 65 | 82.4 | 26.30 |

Furthermore, improvements in the relationship of flow properties of a plasticized polystyrene to its shrinkage in length, as effected by practice of the present invention, are made apparent by an examination of Figure III. Figure III shows the relationship between flow properties and percent shrinkage in length for:

A. Polystyrene containing various amounts of residual monomer (0.3 to 2.0 percent);
B. Substantially monomer-free polystyrene of the present invention containing 0 to 2.5% beta-butoxy-ethyl stearate.

Thus the curves show that, where it is desired to have a polystyrene having a flow of 150 seconds, such a polymer prepared by the present invention, using butoxyethyl stearate as plasticizer, would have an average shrinkage in length of about 17.5 percent (curve B), whereas a polystyrene having the same flow without plasticizer and as formerly prepared would have an average shrinkage in length of about 27 percent.

It is obvious, therefore, that the present invention permits a greater flexibility in the properties of vinyl aryl polymers than was formerly possible. For example, whereas it was formerly necessary to sacrifice resistance to shrinkage and to heat distortion in order to produce a lubricated or plasticized polystyrene having especially good flow properties, it is possible now by the practice of this invention to prepare a plasticized polystyrene having a resistance to shrinkage and to heat distortion approximating that of the present standard commerical grade polystyrene but also having especially good flowing properties. Thus the flow properties of the plasticized polystyrene prepared by the practice of this invention may approximate the good flowing properties of the plasticized, high-shrinkage, high heat-distortion palystyrene heretofore produced. Actually therefore, the present process permits the preparation of a plasticized polystyrene having much better resistance to shrinkage, approximately as good or better resistance to heat distortion and vastly improved flow properties than the standard, unplasticized polystyrene now commercially available.

Moreover, the preparation of plasticized or lubricated polymers by the practice of this invention permits the addition of plasticizer or lubricant to the polymerization mixture before or during the early stages of the polymerization. Other methods of preparing substantially monomer-free polymers are not so advantageously suited to the addition of plasticizer or lubricant to the polymerization mixture, since later treatments for removal of monomer can remove all or part of the plasticizer or lubricant.

Various types of plasticizers are suitable for use in the practice of this invention. Included among these are: fatty acid ester plasticizers, such as butyl stearate, beta-butoxyethyl stearate, methyl oleate, amyl oleate, cyclohexyl stearate; esters of dicarboxylic aliphatic acids, such as dicapyryl sebacate, etc.; aryl ether and ester plasticizers such as dimethyl phthalate, dibutyl phthalate, diamyl phthalate, dibenzyl maleate, beta-phenoxyethyl benzoate, beta-(3-chloro-2-xenoxy)-ethyl levulinate, beta-ethoxyethyl 2-chlorophenoxy - acetate, beta - butoxyethyl phenoxy-acetate, diaryl ether derivatives such as chlorinated diphenyl ether and cyclohexyl chlorinated diphenyl ether, aryloxyalkyl fumarates, such as beta-phenoxyethyl fumarate; triaryl phosphates, 1,3 - di(4 - tertiary - butyl - phenoxy)isobutane, ethyl lactate salicylate, styrene glycol diesters, etc.; hydrocarbon plasticizers such as diphenyl and alkylated derivatives, alkylated naphthalenes, polyisobutylene, polymers of alpha-methyl-styrenes, dimers and trimers of styrene, etc.; chlorinated hydrocarbon plasticizers such as chlorinated waxes, chlorinated diphenyl, chlorinated naphthalene, 1,2-bis(4-chloro-phenyl) ethane; and various other types of plasticizers which are compatible with the vinyl aryl polymers and which do not act to inhibit or appreciably retard the polymerization. The amount of plasticizer to be added usually depends on a number of factors, which include the efficiency of the particular plasticizer, the degree of plasticity desired, etc. In general, however, at least about 0.2–0.5% plasticizer is added before any noted change in flow or plasticity is accomplished.

While it is believed that the improvements in shrink resistance and heat distortion of vinyl aryl polymers made possible by the process of the present invention may be associated with the substantial absence of monomer in these polymers, it is not intended that the scope of the invention be limited in such a manner. Since it is possible that the improvements in thermal properties can be inherent in the process of preparing the polymers and that the absence of monomer can be merely incidental to the accomplishment of these improvements in thermal properties, it is intended that the scope of the invention is more aptly described and claimed according to the process for preparing the polymers as disclosed and claimed herein.

What is claimed is:

1. The process of polymerizing a polymerizable mass comprising a vinyl aryl compound intimately mixed with a catalyst-combination consisting of 2,2-di-(tertiary-butylperoxy)-butane and a benzoyl peroxide of the class consisting of benzoyl peroxide and its chloro, bromo, fluoro, alkoxy, alkyl, benzo and carboperoxy nuclear-substituted derivatives by heating the polymerizable mass at 25°–95° C. until at least about 60 percent conversion to polymer has been effected, and subsequently at 100°–150° C. until substantially complete polymerization has been effected.

2. The process of polymerizing a polymerizable mass comprising a vinyl aryl compound intimately mixed with a catalyst-combination consisting of benzoyl peroxide and 2,2-di-(tertiary-butyl-peroxy)-butane by heating the polymerizable mass at 50°–95° C. until at least about 60 percent conversion to polymer has been effected, and subsequently at 100°–150° C. until substantially complete polymerization has been effected.

3. The process of claim 2, in which the polymerization is conducted in a suspension polymerization system.

4. The process of claim 2, in which the polymerizable mass also contains a plasticizer.

5. The process of claim 2, in which the vinyl aryl compound has an alkyl group substituted on the ring.

6. The process of polymerizing a polymerizable mass comprising styrene intimately mixed with a catalyst-combination consisting of benzoyl peroxide and 2,2-di-(tertiary-butyl-peroxy)-butane by heating the polymerizable mass at 50°–95° C. until at least about 60 percent conversion to polymer has been effected, and subsequently at 100°–150° C. until substantially complete polymerization has been effected.

7. The process of claim 6, in which the polymerization is conducted in a suspension polymerization system.

8. The process for the suspension polymerization of styrene comprising the steps of heating an aqueous suspension of styrene at approximately 90° to 95° C. for at least six hours and subsequently heating at approximately 100° to 116° C. for at least three and one-half hours, said styrene suspension containing a peroxy-catalyst mixture comprising at least about 0.03 percent benzoyl peroxide and at least about 0.0025 percent 2,2 - di - (tertiary - butyl - peroxy) - butane, the total percentage of peroxy-catalysts being at least equivalent to 0.1 percent benzoyl peroxide, and the percentages of peroxy catalysts being based on the weight of styrene.

9. The process for the suspension polymerization of styrene comprising the steps of heating an aqueous suspension of styrene at approximately 90° C. for at least six hours and subsequently heating at approximately 112°–116° C. for at least three and one-half hours, said styrene suspension containing a peroxy catalyst mixture comprising approximately 0.18 percent benzoyl peroxide and approximately 0.05 percent 2,2-di-(tertiary-butyl-peroxy)-butane, the percentages of peroxy catalysts being based on the weight of styrene.

10. The process of copolymerizing a vinyl aryl compound with at least one other copolymerizable ethylenic compound in the presence of benzoyl peroxide and 2,2-di-(tertiary-butyl-peroxy)-butane by heating the polymerization mixture at 50°–95° C. until at least about 60 percent conversion to polymer has been effected and subsequently at 100°–150° C. until substantially complete polymerization has been effected.

11. The process of claim 2 in which the vinyl aryl compound has a chloro group substituted on the ring.

GAETANO F. D'ALELIO.

References Cited in the file of this patent

UNITED STATES PATENTS

| Number | Name | Date |
|---|---|---|
| 2,317,138 | Fletcher | Apr. 20, 1943 |
| 2,328,333 | Freeman et al. | Aug. 31, 1943 |
| 2,331,273 | Lowry | Oct. 5, 1943 |
| 2,394,407 | Soday | Feb. 5, 1946 |
| 2,426,476 | Vaughan et al. | Aug. 26, 1947 |
| 2,444,655 | Kroeker et al. | July 6, 1948 |
| 2,455,569 | Dickey | Dec. 7, 1948 |
| 2,456,558 | Glick | Dec. 14, 1948 |
| 2,485,535 | Park | Oct. 18, 1949 |
| 2,496,653 | Allen | Feb. 7, 1950 |

FOREIGN PATENTS

| Number | Country | Date |
|---|---|---|
| 604,544 | Great Britain | July 6, 1948 |

OTHER REFERENCES

Perry et al., Article in "Modern Plastics," Nov. 1947, pages 134–136, 216, 218, 220 and 222.